(12) United States Patent
Ronca et al.

(10) Patent No.: US 10,484,694 B2
(45) Date of Patent: Nov. 19, 2019

(54) ON-DEVICE MULTIPLEXING OF STREAMING MEDIA CONTENT

(71) Applicant: NETFLIX, INC, Los Gatos, CA (US)

(72) Inventors: David Randall Ronca, Campbell, CA (US); Chung-Ping Wu, Sunnyvale, CA (US); Yung-Hsiao Lai, Fremont, CA (US)

(73) Assignee: NETFLIX, INC., Los Gatos, CA (US)

(*) Notice: Subject to any disclaimer, the term of this patent is extended or adjusted under 35 U.S.C. 154(b) by 1038 days.

(21) Appl. No.: 14/685,558

(22) Filed: Apr. 13, 2015

(65) Prior Publication Data

US 2015/0222910 A1 Aug. 6, 2015

Related U.S. Application Data

(63) Continuation of application No. 12/642,567, filed on Dec. 18, 2009, now Pat. No. 9,009,337.

(Continued)

(51) Int. Cl.
*H04N 21/2368* (2011.01)
*H04N 19/167* (2014.01)
(Continued)

(52) U.S. Cl.
CPC ........... *H04N 19/167* (2014.11); *H04L 65/60* (2013.01); *H04L 65/607* (2013.01); *H04N 19/115* (2014.11); *H04N 19/164* (2014.11); *H04N 19/177* (2014.11); *H04N 19/46* (2014.11); *H04N 19/61* (2014.11); *H04N 21/2368* (2013.01); *H04N 21/23424* (2013.01); *H04N 21/23439* (2013.01); *H04N 21/23611* (2013.01);
(Continued)

(58) Field of Classification Search
CPC ............... H04N 21/233–2368; H04N 21/2368
See application file for complete search history.

(56) References Cited

U.S. PATENT DOCUMENTS 5,414,455 A 5/1995 Hooper et al.
5,608,732 A 3/1997 Bestler et al.
(Continued)

FOREIGN PATENT DOCUMENTS

EP 1670256 A2 6/2006
EP 1672925 A1 6/2006
(Continued)

OTHER PUBLICATIONS

Extended European Search Report for application No. PCT/US2011/063564 dated Sep. 11, 2014.
(Continued)

*Primary Examiner* — David R Lazaro
*Assistant Examiner* — Julian Chang
(74) *Attorney, Agent, or Firm* — Artegis Law Group, LLP

(57) ABSTRACT

Techniques are disclosed for multiplexing a dynamic bit-rate video stream with an audio stream received by a client device in a manner that allows the resulting multiplexed stream to be played back without disruption, despite dynamic changes in the bit rate of the video stream that may occur. A content server may stream both a video stream and an audio stream to a client device for playback. The client device may multiplex the video and audio streams prior to them being presented to a playback engine for decoding and playback to a user.

20 Claims, 8 Drawing Sheets

Related U.S. Application Data

(60) Provisional application No. 61/140,032, filed on Dec. 22, 2008, provisional application No. 61/164,327, filed on Mar. 27, 2009.

(51) Int. Cl.

| | | |
|---|---|---|
| H04N 21/234 | (2011.01) | |
| H04N 21/236 | (2011.01) | |
| H04N 21/262 | (2011.01) | |
| H04N 21/44 | (2011.01) | |
| H04N 21/4402 | (2011.01) | |
| H04N 21/462 | (2011.01) | |
| H04N 19/115 | (2014.01) | |
| H04N 19/61 | (2014.01) | |
| H04N 19/164 | (2014.01) | |
| H04N 19/177 | (2014.01) | |
| H04N 19/46 | (2014.01) | |
| H04L 29/06 | (2006.01) | |
| H04N 21/2343 | (2011.01) | |
| H04N 21/2662 | (2011.01) | |
| H04N 21/432 | (2011.01) | |
| H04N 21/434 | (2011.01) | |

(52) U.S. Cl.
CPC ... *H04N 21/2662* (2013.01); *H04N 21/26258* (2013.01); *H04N 21/4325* (2013.01); *H04N 21/4346* (2013.01); *H04N 21/44016* (2013.01); *H04N 21/44029* (2013.01); *H04N 21/4621* (2013.01)

(56) References Cited

U.S. PATENT DOCUMENTS

| | | | |
|---|---|---|---|
| 5,907,363 A | 5/1999 | Botsford, III et al. | |
| 6,138,147 A * | 10/2000 | Weaver | G11B 27/031 348/E5.008 |
| 6,249,319 B1 * | 6/2001 | Post | H04N 21/2368 348/423.1 |
| 6,298,089 B1 * | 10/2001 | Gazit | G11B 27/036 375/240.28 |
| 6,438,630 B1 | 8/2002 | DeMoney | |
| 6,453,114 B2 | 9/2002 | Schultz et al. | |
| 6,678,332 B1 | 1/2004 | Gardere et al. | |
| 6,721,952 B1 | 4/2004 | Guedalia et al. | |
| 6,738,427 B2 | 5/2004 | Zetts | |
| 6,792,047 B1 * | 9/2004 | Bixby | H04N 21/23424 375/240.26 |
| 6,795,506 B1 * | 9/2004 | Zhang | H04L 29/06027 348/390.1 |
| 6,865,339 B1 | 3/2005 | Gable et al. | |
| 6,907,081 B2 * | 6/2005 | Mantchala | H04N 21/23412 348/700 |
| 6,967,910 B2 | 11/2005 | Yamamoto | |
| 6,993,081 B1 * | 1/2006 | Brunheroto | H04N 21/23406 370/487 |
| 7,031,348 B1 * | 4/2006 | Gazit | H04N 21/23406 348/423.1 |
| 7,096,481 B1 * | 8/2006 | Forecast | H04N 21/23406 348/E5.008 |
| 7,096,488 B1 | 8/2006 | Zhang et al. | |
| 7,212,726 B2 | 5/2007 | Zetts | |
| 7,234,007 B2 | 6/2007 | Castellano et al. | |
| 7,263,129 B2 | 8/2007 | Kawa et al. | |
| 7,359,615 B2 | 4/2008 | Miyagoshi et al. | |
| 7,401,091 B2 * | 7/2008 | Orchard | H04N 21/23418 707/822 |
| 7,583,733 B1 | 9/2009 | Zhang et al. | |
| 7,818,444 B2 | 10/2010 | Brueck et al. | |
| 8,631,455 B2 | 1/2014 | Park et al. | |
| 2001/0013123 A1 * | 8/2001 | Freeman | H04H 60/07 725/34 |
| 2001/0022789 A1 | 9/2001 | Huang et al. | |
| 2002/0012395 A1 | 1/2002 | Song et al. | |
| 2002/0135608 A1 * | 9/2002 | Hamada | G11B 27/105 715/723 |
| 2003/0014484 A1 | 1/2003 | Netzer et al. | |
| 2003/0016702 A1 | 1/2003 | Bender et al. | |
| 2003/0067872 A1 | 4/2003 | Harrell et al. | |
| 2003/0165150 A1 | 9/2003 | Zimmermann et al. | |
| 2003/0185301 A1 | 10/2003 | Abrams et al. | |
| 2004/0031054 A1 | 2/2004 | Dankworth et al. | |
| 2004/0218093 A1 * | 11/2004 | Radha | H04N 21/233 348/384.1 |
| 2005/0036557 A1 | 2/2005 | Balakrishnan et al. | |
| 2005/0066063 A1 | 3/2005 | Grigorovitch et al. | |
| 2005/0100094 A1 | 5/2005 | Keesman | |
| 2005/0114909 A1 * | 5/2005 | Mercier | G11B 20/00086 725/141 |
| 2005/0123274 A1 | 6/2005 | Crinon et al. | |
| 2006/0026294 A1 | 2/2006 | Virdi et al. | |
| 2006/0153381 A1 * | 7/2006 | Kim | H04N 7/1675 380/228 |
| 2006/0155563 A1 | 7/2006 | Banerjee et al. | |
| 2006/0272479 A1 | 12/2006 | Takatsuka et al. | |
| 2007/0053446 A1 | 3/2007 | Spilo et al. | |
| 2007/0110237 A1 * | 5/2007 | Tehranchi | G06T 1/0035 380/201 |
| 2007/0121678 A1 | 5/2007 | Brooks et al. | |
| 2007/0157234 A1 | 7/2007 | Walker | |
| 2007/0162568 A1 * | 7/2007 | Gupta | G06Q 30/0242 709/219 |
| 2007/0162927 A1 | 7/2007 | Ramaswamy et al. | |
| 2007/0189710 A1 * | 8/2007 | Pedlow, Jr. | G11B 27/034 386/283 |
| 2007/0211718 A1 | 9/2007 | Kang et al. | |
| 2007/0225840 A1 * | 9/2007 | Yahata | G11B 20/00007 700/94 |
| 2008/0005676 A1 * | 1/2008 | Evans | H04N 7/163 715/740 |
| 2008/0034276 A1 | 2/2008 | Ficco | |
| 2008/0043587 A1 | 2/2008 | Gandolph et al. | |
| 2008/0062322 A1 | 3/2008 | Dey et al. | |
| 2008/0086570 A1 | 4/2008 | Dey et al. | |
| 2008/0112685 A1 * | 5/2008 | Kato | G06F 21/10 386/278 |
| 2008/0148324 A1 | 6/2008 | Joyce et al. | |
| 2008/0177893 A1 | 7/2008 | Bowra et al. | |
| 2008/0181221 A1 | 7/2008 | Kampmann et al. | |
| 2008/0225953 A1 | 9/2008 | Ratakonda et al. | |
| 2008/0259799 A1 | 10/2008 | van Beek | |
| 2009/0003603 A1 | 1/2009 | Wessel, Jr. et al. | |
| 2009/0083279 A1 | 3/2009 | Hasek | |
| 2009/0116551 A1 | 5/2009 | Nilsson et al. | |
| 2009/0172167 A1 | 7/2009 | Drai et al. | |
| 2009/0187762 A1 * | 7/2009 | Okamoto | G06F 21/10 713/157 |
| 2009/0210900 A1 * | 8/2009 | Kaftan | H04N 21/23431 725/34 |
| 2009/0217318 A1 * | 8/2009 | VerSteeg | G06Q 30/02 725/32 |
| 2009/0296741 A1 | 12/2009 | Kizuka et al. | |
| 2009/0300203 A1 | 12/2009 | Virdi et al. | |
| 2009/0300204 A1 | 12/2009 | Zhang et al. | |
| 2010/0011117 A1 | 1/2010 | Hristodorescu et al. | |
| 2010/0014594 A1 * | 1/2010 | Beheydt | H04N 21/23424 375/240.26 |
| 2010/0022789 A1 | 1/2010 | Mignani et al. | |
| 2010/0036863 A1 | 2/2010 | Koifman et al. | |
| 2010/0100742 A1 * | 4/2010 | Courington | H04N 21/4181 713/176 |
| 2010/0135637 A1 * | 6/2010 | McDermott | G11B 27/034 386/344 |
| 2010/0142915 A1 * | 6/2010 | McDermott | G11B 27/034 386/343 |
| 2010/0158101 A1 | 6/2010 | Wu et al. | |
| 2010/0161825 A1 | 6/2010 | Ronca et al. | |
| 2010/0180044 A1 | 7/2010 | Olsson et al. | |
| 2010/0186025 A1 | 7/2010 | Thomas et al. | |
| 2010/0189183 A1 | 7/2010 | Gu et al. | |

(56) References Cited

U.S. PATENT DOCUMENTS

| | | |
|---|---|---|
| 2011/0019976 A1 | 1/2011 | Park et al. |
| 2011/0023076 A1 | 1/2011 | Park et al. |
| 2011/0082945 A1 | 4/2011 | Myers et al. |
| 2011/0122939 A1 | 5/2011 | Ganesan et al. |
| 2011/0314095 A1* | 12/2011 | Gupta ............... H04N 21/23412 709/203 |
| 2012/0023155 A1 | 1/2012 | Myers et al. |
| 2012/0072958 A1* | 3/2012 | Smyth ................ H04N 7/17318 725/93 |
| 2012/0141089 A1 | 6/2012 | Hunt |
| 2012/0278449 A1 | 11/2012 | Wu et al. |
| 2014/0189771 A1 | 7/2014 | Park et al. |

FOREIGN PATENT DOCUMENTS

| | | |
|---|---|---|
| EP | 2257073 A1 | 12/2010 |
| JP | 2004172830 A | 6/2004 |
| JP | 2006174419 A | 6/2006 |
| JP | 2007036666 A | 2/2007 |
| JP | 2008537393 A | 9/2008 |
| WO | 2007063901 A1 | 6/2007 |
| WO | 2008105695 A1 | 9/2008 |
| WO | 2009149100 A1 | 12/2009 |

OTHER PUBLICATIONS

International Search Report and Written Opinion for Application No. PCT/US2009/069068 dated Feb. 23, 2010.
International Search Report and Written Opinion for Application No. PCT/US2009/069071 dated Mar. 1, 2010.
International Search Report and Written Opinion for Application No. PCT/US20111063564 dated Apr. 20, 2012.
International Search Report and Written Opinion for Application No. PCT/US2012/022103 dated May 10, 2012.
International Search Report and Written Opinion for Application No. PCT/US2010/043103 dated Sep. 10, 2010.
International Search Report and Written Opinion for Application No. PCT/US2010/043114 dated Sep. 13, 2010.
PCT Search Report for Application No. PCT/US09/69068, dated Feb. 23, 2010.
PCT Search Report for Application No. PCT/US09/69071, dated Mar. 1, 2010.
PCT Search Report for Application No. PCT/US2010/045805, dated Oct. 6, 2010.

* cited by examiner

ON-DEVICE MULTIPLEXING OF STREAMING MEDIA CONTENT

CROSS REFERENCE TO RELATED APPLICATION

This application is a continuation of U.S. Ser. No. 12/642,567, filed Dec. 18, 2009, which claims priority to the provisional patent application titled "Seamless Bit Rate Stream Switching," filed on Dec. 22, 2008 and having Ser. No. 61/140,032. This application also claims priority to the provisional patent application titled "Seamless Bit Rate Stream Switching," filed on Mar. 27, 2009 and having Ser. No. 61/164,327. Each of these related applications is hereby incorporated herein in its entirety.

BACKGROUND OF THE INVENTION

Field of the Invention

Embodiments of the invention generally relate to the playback of audio and video data streamed over a computer network to a client device. More specifically, embodiments of the present invention relate to multiplexing dynamic bit-rate video and audio video streams on a client device.

Description of the Related Art

Consumer demand for digital video products has greatly increased in recent years. Examples of popular applications include video conferencing, video security and surveillance and, importantly, the distribution of entertainment content, including a rapidly a growing market for Internet video streaming. Video encoding and compression is a common component of these applications. Coding-decoding (codec) algorithms allow digital video and audio data to be transmitted in real time. Several codecs currently in use have been developed as an industry standard such as MPEG-2, MPEG-4, H.264/AVC and AVS, while others are proprietary algorithms, such as On2, Real Video, and Windows Media Video (WMV) (now standardized by SMPTE as VC-1).

Internet video streaming of compressed audio and video is typically performed using a network of computing systems collectively referred to as a digital content distribution system. And such systems typically include a content server, a content player, and a communications network connecting the content server to the content player. The content server stores digital content files available for download from the content server to the content player. The digital content files correspond to movies, televisions shows, sporting events, music productions, etc. The digital content file typically provides sequential content data, organized according to playback chronology, including audio data and/or video data.

The content player (e.g., a Blu-ray® disk player) downloads and plays a digital content file, usually in response to a user request. The process of playing the digital content file includes decoding and rendering audio and video data to generate audio and video signals sent to speakers and a display screen. In practice, the content server transmits (i.e., streams) digital content to the content player, which plays the digital content file while content data is being received. To account for variable latency and bandwidth within the communications network, a content buffer queues incoming content data ahead of the content data actually being played. During periods of network congestion, which leads to lower available bandwidth, less content data is added to the content buffer, which may drain down as content data is being de-queued to support playback at a certain playback bit rate. However, during periods of high network bandwidth, the content buffer is replenished and additional buffer time is added until the content buffer is generally full again. In particular systems, the content buffer may queue content data corresponding to a time span ranging from seconds to more than a minute.

SUMMARY OF THE INVENTION

One embodiment of the present invention includes a method for encoding a media file to allow on-device multiplexing of audio and video data and dynamic bit rate switching. The method may include providing a plurality of video encodings of the media file. Each video encoding may provide an encoding of the media file at a distinct video bit rate and each video encoding may include a plurality of portions of video data. In each of the plurality of portions of video data, one or more insertion points for multiplexing portions of video data with portions of audio data on the client device is identified. Additionally, one or more of the portions of video data may be padded to be aligned to a continuity count boundary. The method may also include storing, in the video encoding, a file header which includes an indication of the positions of the plurality of insertion points in the video encoding and providing at least one audio encoding of the media file. The audio encoding may include a header indicating a plurality of audio segments, each corresponding to one of the plurality of portions of video data. The method may also include storing the plurality of video encodings and the audio encoding on a media delivery system in order to be streamed to client device upon request.

In a particular embodiment, each of the plurality of video encodings includes a sequence of one or more groups of pictures (GOPs). For example, each GOP may be encapsulated in a sequence MPEG-2 transport stream packets. In such a case, padding at least one portion of video data to be aligned to a continuity count boundary may comprise adding video filler packets such that each GOP begins with an MPEG-packet having a continuity count of 0 and ends with a packet having a continuity count of 15.

In a particular embodiment, the method may further include receiving, from a client device, a request to stream the media file, transmitting, to the client device, the file header generated for each of the plurality of video encodings and the file header generated for the audio encoding. In response to requests from the client device, portions of video data from at least one of the video encodings and audio segments form the audio encoding may be streamed to the client device. Further, the client device may be configured to multiplex the streamed portions of video data with the streamed portions of audio segments to generate a multiplexed stream presented to a playback engine on the client device for decoding and playback. The client device may be further configured to switch streaming portions of video data from a first one of the video encodings to a second one of the video encodings.

Another embodiment of the invention includes a computer-implemented method for multiplexing an audio stream and a video stream on a client device. The method may generally include transmitting, to a streaming media server, a request to stream a media file stored on the streaming media server. The method may also include receiving, from the streaming media server, a file header describing each of a plurality of video encodings of the media file available from the streaming media server, and receiving, from the streaming media server, a file header describing at least one audio encodings of the media file available from the streaming media server. The method may also include transmitting, to the streaming media server, a request to download at first portion of video data from a first one of the plurality of video encodings and at least a first portion of audio data from the audio encoding, receiving the requested first portion of video data and first portion of audio data, and multiplexing the first portion of video data and first portion of audio to generate a multiplexed stream for playback by a playback engine on the client device.

In a particular embodiment, this method may also include transmitting, to the streaming media server, a second request to download at second portion of video data from a second one of the plurality of video encodings and at least a second portion of audio data from the audio encoding. And in response, receiving the requested second portion of video data and second portion of audio data. This method may also include multiplexing the second portion of video data and second portion of audio for playback by the playback engine on the client device and adding the multiplexed second portion of video data and second portion of audio to the multiplexed stream. The playback engine is generally configured to decode and playback the multiplexed stream without disrupting playback when decoding and playing back the first and second portions of video data.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention may be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
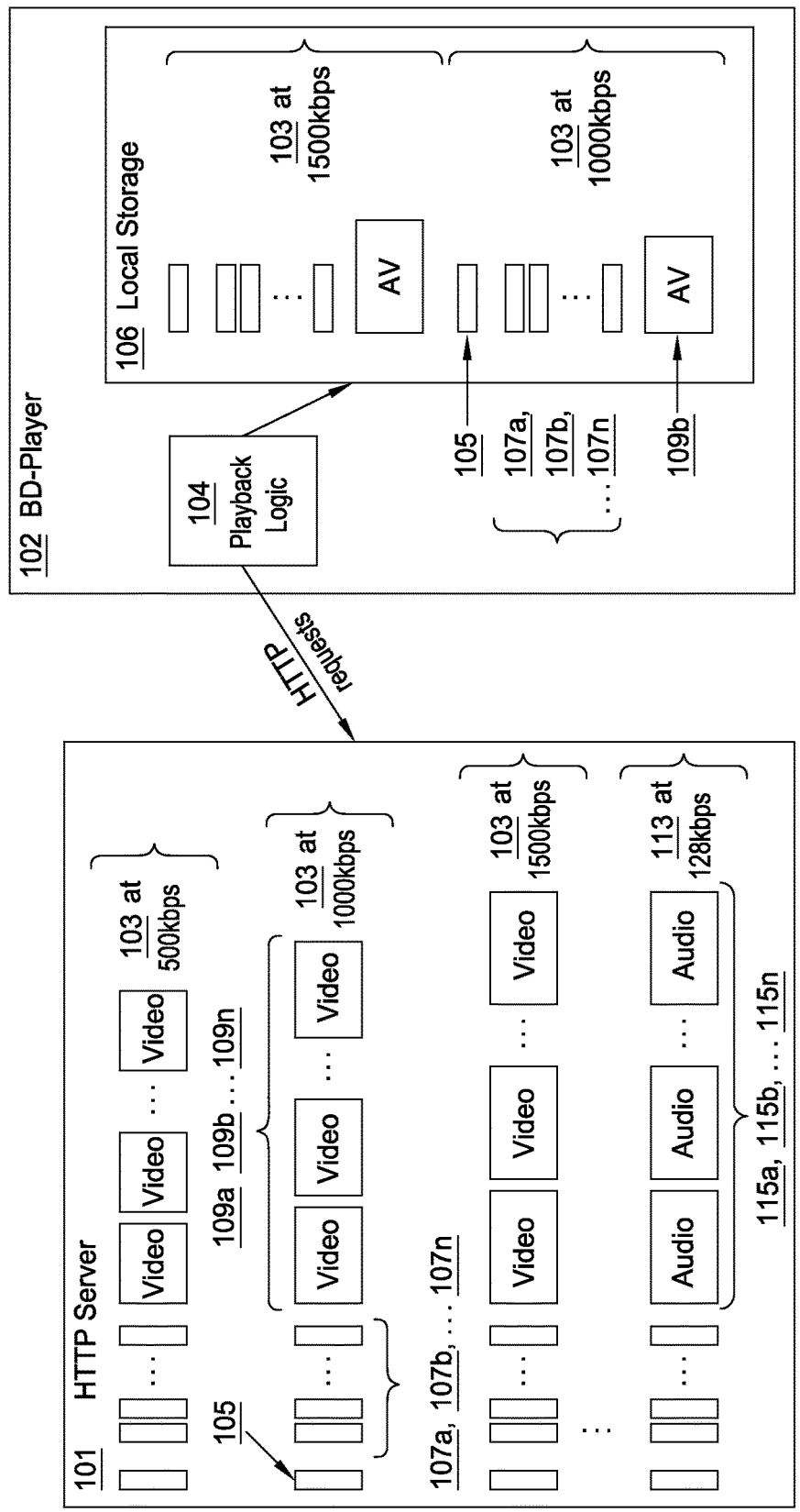
FIG. 1 illustrates bit rate switching and on-device multiplexing in a Blu-Ray® disc player, according to the specification published by the Blu-Ray Disc Association.

Embodiments of the invention provide techniques for decoding and playing media content streamed over a communications network to a networked client device, such as a set-top box, PC, mobile telephone, video gaming platform, or Blu-ray® disc player. More specifically, embodiments of the invention provide for multiplexing a dynamic bit-rate video stream with an audio stream received by a client device in a manner that allows the resulting multiplexed stream to be played back without disruption, despite dynamic changes in the bit rate of the video stream that may occur.

In practice, a digital content file (e.g., a movie title) stored on a content server may be encoded using a variety of different bit rates. Prior to initiating playback, the content player may measure available bandwidth from the content server and select a digital content file having a bit rate that can be supported by the measured available bandwidth. To maximize playback quality, the content player may select to stream the digital content file with the highest bit rate that does not exceed the measured bandwidth. However, the amount of bandwidth available may change during playback of AV programs downloaded over a data network. Thus, it becomes desirable to seamlessly switch between video streams of varying bit rates, e.g., to reduce the streaming bit rate when prevailing network bandwidth deteriorates. Seamless bit rate stream switching during playback balances a viewer's desire for a high quality viewing experience and efficient use of the available network bandwidth of the network connection over which AV programs are downloaded. For example, the first few seconds of a program sent over a network to a digital media player after the viewer initiates playback may be digitally encoded at a low bit rate so as to reduce the transmission time of program content over the network and hence minimize the delay between initiating playback and presenting content to the viewer. Thereafter, as playback continues, the bit rate of encoded content sent to the digital media player may be increased to take advantage of available network bandwidth and to present the highest quality audiovisual content to the viewer.

However, certain prevalent techniques for switching bit rates in some digital media players are awkward and significantly degrade a viewer's viewing experience. For example, the Blu-ray® Disc Association (BDA), an industry consortium responsible for establishing format standards for Blu-ray® disc technology, has established standards known collectively as the "Blu-ray® Disc Format Specifications" that include the "Blu-ray® Disc Read-Only Memory (ROM) Format," the "Blu-ray® Disc recordable Format," and the "Blu-ray® Disc Rewritable Format." For ease of reference, these specifications are referred to herein as a collection as the "Blu-ray® specification."

The Blu-ray® specification includes specifications for a Blu-ray® Disc Player (BD-Player) to playback digitally encoded AV programs downloaded over a data network such as the Internet. According to the Blu-ray® specification, portions of an AV program downloaded to a BD-Player may be stored in a local storage as one or more AV stream files subsequently delivered to the decoder of the BD-Player as a stream of AV data for playback. Effectively, the downloaded AV program is presented to the decoder as a virtual Blu-ray® disc. However, the Blu-ray® specification requires configuring the decoder of the BD-Player with a size and a time length of all portions of an AV program contained in the AV stream files before playback of the AV program can begin. Thus, switching bit rates during playback of an AV program requires that the decoder of the BD-Player be reconfigured because the size or number of portions of the AV program typically changes when the bit rate is switched. Other protocols for streaming AV content over data networks may have similar requirements for configuring size or length of portions of an AV program prior to content streaming and playback. Reconfiguring the decoder during playback is a suboptimal solution for changing video (or audio) bit rates because doing so noticeably disrupts an otherwise smooth presentation of audio and video.

In one embodiment, a content server may stream both a video stream and an audio stream to a client device for playback. The client device may multiplex the video and audio streams prior to them being presented to a playback engine. Further, as noted above, the bit rate of the video stream may change during playback in response to changes in prevailing bandwidth conditions. However, as also noted above, some devices have certain constraints regarding how digital media is presented to a playback engine for decoding and presentation to a viewer. For example, a playback engine on a Blu-ray® disc player may require a multiplexed and encrypted data stream, where both a size and a length of each portion of an AV program data is specified before playback of the AV program can begin.

Accordingly, in one embodiment, a stream formatter or other playback logic on the client device may be configured to present such a playback engine with a multiplexed video stream that satisfies these constraints. As described in greater detail herein, the available video stream files for a given title may be encoded in a manner to support on-device multiplexing with dynamic bit rate switching. For example, each file encoding a video or audio stream may include a header specifying the portions (and sizes) of AV data is contained in a given audio or video file. In one embodiment, the stream formatter may be configured to retrieve this information regarding each available video (and audio) stream file available for a given title prior to initiating playback. And the stream formatter may use this information to build an index of the stream used to configure the playback engine as well as to multiplex the audio and video streams. For example, the playback engine may be configured with a size for each portion of the video data specified as the largest size of that portion stored in any of the any of the available bit rate encodings. If a portion is then played back using a lower-bit rate, the stream formatter may pad that portion as needed so as to match the size specified when the playback engine was configured.

The header generated for a given video stream may include a field indicating the size of the header, a field indicating byte (or packet) offset where the header ends and stream data begins, and an index listing insertion points in each group of pictures (GOP) where a segment of audio may be multiplexed with the video to provide a multiplexed AV stream for a playback engine on a client device.

Further, during playback, the stream formatter may change the bit rate at which video is being decoded and played back by changing which video file is being streamed from the content server, multiplexed with an audio file, and supplied to the playback engine for decoding and playback, without also requiring the playback engine to be reconfigured with each bit rate change and without causing other disruptions to playback of the streaming media content. That is, the formatter may vary the bit rate of the video in an encrypted stream while still presenting it to the playback engine as a single multiplexed stream.

In one embodiment, each bit rate encoding of a media file includes a plurality of GOPs and each GOP may be stored in a variable number of transport stream packets (e.g., MPEG-2 M2TS packets), depending on the byte size of the GOP itself Note, the MPEG-2 standard specifies a fixed packet size of 188 bytes in length. However, additional fields may be added by other standards. For example, the Blu-ray® specification adds four bytes of additional data to each 188 byte MPEG-2 packet, resulting in a packet size of 192 bytes). By configuring each GOP to begin on an I-frame boundary (a frame which contains all necessary rendering information within itself, and includes a sequence header at the start of each GOP), the bit rate (and video data supplied to the playback engine) may be changed at any GOP boundary without disrupting video playback (save for an increase or decrease in video quality resulting form the change in bit-rate). To preserve a playback continuity count included in the header of each MPEG-2 transport stream packet, each GOP may be padded with video filler packets so as to end with a continuity count of 15, resulting in each successive GOP to begin with a packet having a continuity count of 0 (assuming a four-bit continuity counter is used, as is the case for the MPEG-2 transport stream standard). This allows the bit rate to be switched at any GOP boundary without resulting in a continuity count error.

Note however, although a particular embodiment of the invention is described using a BD-Player which implements the Blu-ray® specifications as an example of a client device, it should be understood that embodiments of the invention may be adapted to for a broad variety of streaming media protocols. Accordingly, references to the Blu-ray® specifications or a BD-Player are made as an illustrative example and not intended to be limiting of the present invention. Further, in the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

FIG. 1 illustrates bit rate switching and on-device multiplexing in a Blu-Ray® disc player, according to the specification published by the Blu-Ray Disc Association. As shown, a HyperText Transfer Protocol (HTTP) server 101 is coupled to a Blu-ray Disc Player 102 via a data communications network, such as the Internet. In the example, server 101 stores multiple video files 103 and an audio file 113, each corresponding to a given media property (e.g., a movie). In this example, video files 103 encode the given media property in three different bit rates: 500 kbps, 1000 kbps, and 1500 kbps. Additionally, the audio file 113 encodes an audio stream associated with the media property at 128 kpbs. Each video file 103 includes a header having a playlist information file 105, segments of video (e.g., MPEG-2 transport stream packets of storing video data corresponding to 2 seconds of video at a progressive frame rate of 30 fps), and one or more clip information files. Each clip information file corresponds to one of the segments of video data. For example, the file 103 stored at 1000 kbps includes a playlist information file 105, clip information files 107*a-n*, and corresponding video stream files 109*a-n*.

Each AV stream file has a corresponding clip information file that stores time stamps of the access points into the corresponding AV stream file that are referenced in the playlist information file. During playback of an AV program, and in particular, during playback of a portion of the AV program that corresponds to a playing interval defined in the playlist information file, the BD-Player reads the clip information file to find out the position where it should begin to read data from the AV stream file corresponding to the playing interval. Further, the clip information files include information indicating where segments of audio from audio file 113 may be multiplexed with segments of video. For example, assume each video stream file 109a-n stores approximately 2 seconds of video, and each corresponding segment of audio stores approximately 2 seconds of audio. In such case, the clip information files 107a-n may indicate a byte (or packet) offset indicting a first and second point for each video stream file 109a-n at which to insert a portion of the corresponding audio file 115a-n, resulting in a multiplexed stream with alternating segments of audio and video data every two-thirds of a second. Of course, the size and playback length of segments of audio and video data may be tailored to suit the needs of a particular case. Nevertheless, as the Blu-ray® specification allows for a maximum separation between video and audio data of up to 1 second, using a video and audio segment size of approximately 2 seconds and a multiplexed stream alternating between audio and video every two-third seconds has proven to be effective.

As shown, BD-Player 102 includes playback logic 104 and local storage 106. The Blu-ray specification standard provides specifications for playback logic 104 to download and write files to local storage 106 including playlist information files, clip information files, and multiplexed audio visual stream files. In effect, the Blu-ray specification standard allows playback logic 104 to use local storage 106 to create a virtual Blu-ray Disc that includes AV program content downloaded from a server over a network. To create such a virtual Blu-ray Disc using local storage 106, playback logic 104 must store playlist information files, clip information files, and AV stream files in accordance with the Blu-ray® specification.

In particular, according to the Blu-ray specification, playback of an AV program (e.g., AV program 103) cannot start until the corresponding playlist information file (e.g., playlist information file 105), all corresponding clip information files (e.g., clip information files 107a-n), and at least one AV stream file (i.e., an audio visual stream multiplexed from one of the video files 103 and the audio file 113) is completely downloaded to local storage 106. Once these files are present in local storage 106, playback logic 104 can cause BD-Player 102 to begin playback of the AV stream multiplexed from video file 103 and audio file 113. After playback starts, playback logic 104 can continue to cause BD-Player 102 to download the remaining video files (e.g., video files 109b-n) and audio files (e.g., audio files 115b-n) for multiplexing. So long as the next stream file needed at BD-Player 102 is completely downloaded to local storage 106 and multiplexed by playback logic 104 before the BD-Player has finished playing the current AV stream file, playback of an AV program will be presented to the viewer without any momentary stops or flickers or other playback events that cause a noticeable interruption of smooth audio and video playback.

However, as discussed above, it may be desirable to switch bit rates during playback of a video program. For example, if BD-Player 102 is connected to HTTP server 101 through a typical home Digital Subscriber Line (DSL) or cable modem which can download data at approximately 1500 kbps, concurrent usage of the home DSL or cable modem, for example, by another family member, can cause BD-Player 102 to fall behind in downloading AV stream files from server 101. That is, BD-Player 102 can no longer download AV stream files from server 101 as fast as the rate at which the AV stream files are being streamed to the decoder of the BD-Player. In such a case, it would be useful to be able to seamlessly switch, for example, from playing AV stream files at 1500 kbps to playing AV stream files at 1000 kbps.

Unfortunately, to switch bit rates according to the Blu-ray specification, the playlist information file, all the clip information files, and at least one AV stream file for the new bit rate must be completely downloaded to local storage 106 before playback of the AV program at the new bit rate can begin. For example, to switch from playback of AV program 103 at 1500 kbps to playback of AV program 103 at 1000 kbps, playlist information file 105, clip information files 107a-n, and at least one video files 109a-n must be completely downloaded to local storage 106 before BD-Player 102 can switch to playback of AV program 103 at 1000 kbps If the streaming bit rate were switched during playback of AV program 103 encoded at 1500 kbps, visible interruptions may occur as switching to a different playlist information file is not seamless for media processed according to the Blu-Ray® specification. Instead, switching to a different playlist information file results in a visible interruption in viewing a program that may last several seconds, causing a poor user experience.

In one embodiment, a BD-Player may be configured with additional playback logic to allow for seamless bit rate switching during playback, without requiring the BD-Player to be reconfigured with changed size data and without causing a noticeable interruption of smooth audio and video playback. In particular, as video files are downloaded for playback, the size of the video file (or the size of groups of pictures (GOPs) in the clip file) is compared with a clip information file. The clip information file may be used to configure the BD-Player prior to initiating playback of streaming AV data. The playback logic 105 may pad the video file (or one or more GOPs in the clip file) such that the size of the clip file matches the configured size specified in the clip information file. Once padded, the video file 103 may be multiplexed with the corresponding audio clip 115a-n and presented to the decoder of the BD-player 102. Note, as shown, clips 115a-n from a single audio file 113 are multiplexed with any of the video files 103 as the video bit rate is switched as appropriate using the techniques described herein. However, in an alternative embodiment, the audio data may also include multiple files, each encoded at different bit rates. In such a case, the playback logic 104 may also switch between audio bit rates as appropriate for prevailing bandwidth conditions.

Figure 2:
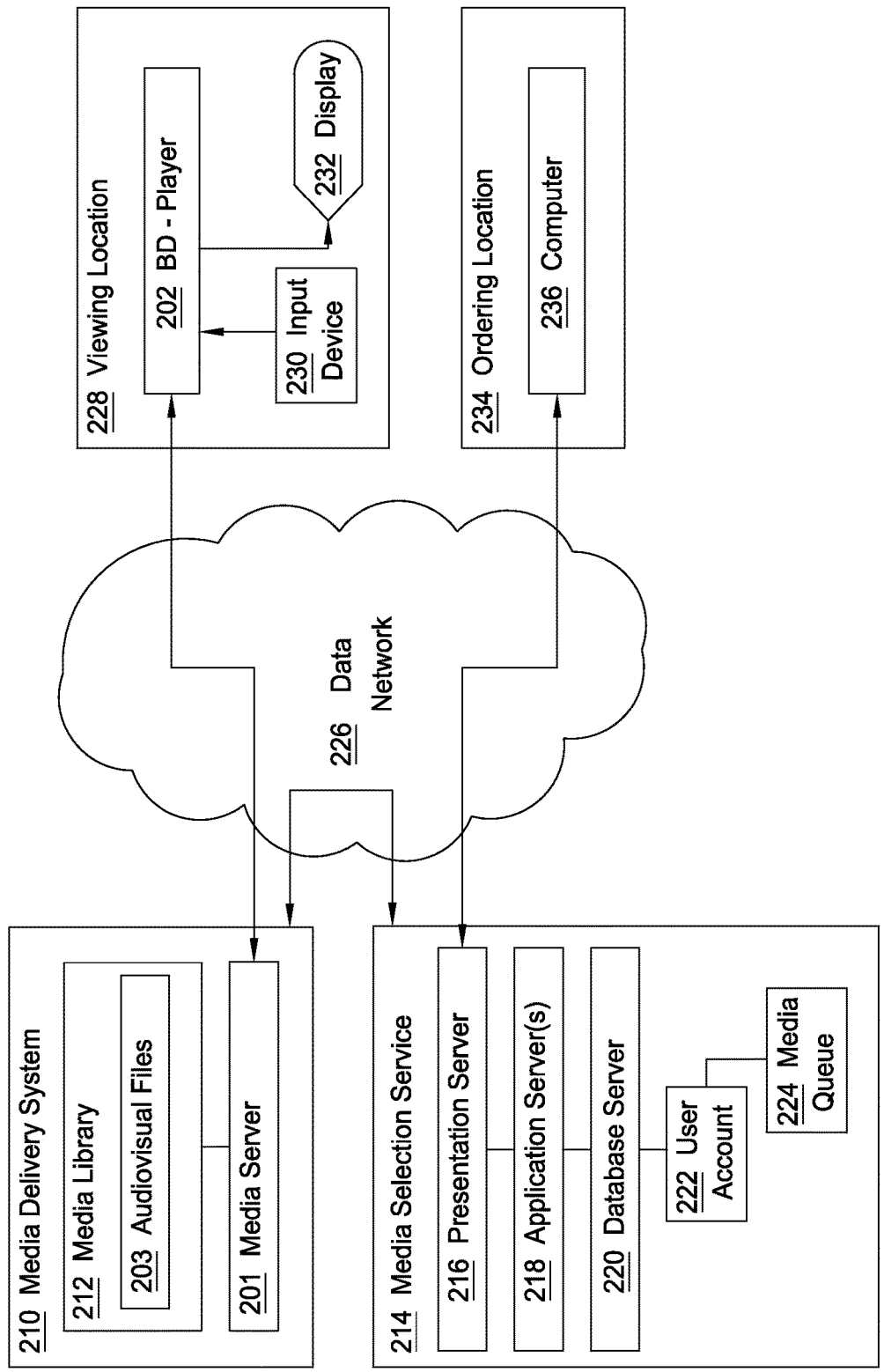
FIG. 2 illustrates an example networked computing environment which includes a media delivery system streaming content to a networked client device, according to one embodiment of the invention.

FIG. 2 illustrates an example networked computing environment which includes a media delivery system 210 streaming content to a networked client device, according to one embodiment of the invention. As shown, FIG. 2 illustrates a media delivery system 210, media selection service 214, viewing location 228, and ordering location 234. In one embodiment, a media server 201 of the media delivery system 210, presentation server 216 of media selection service 214, BD-Player 202 of the viewing location 228, and computer 236 of the ordering location 234 are all connected to data network 226. The data network 226 is included to be representative of any combination of computer networks capable of delivering data from one computer to another. For example, data network 226 may comprise any combination of a local area network ("LAN"), a wide area network ("WAN"), the Internet, a telecommunications network, a satellite network, a cable television network, or a wireless network. Further, data network 226 may itself include one or more networks coupled together to form a single logical network and that supports appropriate network protocols (e.g., TCP/IP for the Internet).

Illustratively, media delivery system 210 includes a media library 212 that comprises AV files 203. The term "audio-visual program" or "AV program" as used herein refers broadly to a collection of audio stream files, video stream files, or multiplexed audiovisual files that can be delivered using a streaming media protocol over a data network. Examples of AV programs include music, recordings of spoken words, sports programs, television series episodes, documentary motion pictures, instructional programs, or any other form of program. AV files 203 include a stored set of files that can be delivered on demand over a network connection to a computer such as BD-Player 202. In a practical embodiment, there may be thousands of AV programs stored in or managed by the media delivery system 210. AV files 203 may include multiple video (and/or audio) encodings of a given title, where each encoding is made at a different bit-rate. Further, in one embodiment, the AV files 203 may include separate audio and video streams for one or more titles. In such a case, when a user requests a particular title, the audio and video streams delivered to a user may be multiplexed together by playback logic on the BD-player 202 prior to being decoded and played back to the user.

As shown, media delivery system 210 also includes media server 201 coupled to the media library 212. Media server 201 generally is configured to retrieve a selected or specified file or files that comprise AV files 203 from the media library 212 in response to a request from BD-Player 202 and deliver the files using a streaming media protocol to the BD-Player 202 in response to the request. In one embodiment, media server 201 is configured to deliver files stored in media library 212 using the HyperText Transfer Protocol (HTTP) and/or HTTP over Secure Socket Layer (HTTPS) through data network 226 to BD-Player 202. However, embodiments are not limited to any particular network protocol and any suitable network protocol may be used to deliver AV program content from media delivery system 210 to BD-Player.

Also as shown, media selection service 214 includes a presentation server 216, one or more application servers 218, and a database server 220. The media selection service 214 may be integrated into or co-located with the media delivery system 210 as a single system, and the media delivery system 210 may be implemented as an application on the application servers 218 or otherwise contained within the media selection service 214. In the media selection service 214, the one or more application servers 218 are coupled to the presentation server 216 and database server 220.

The database server 220 maintains a user account 222 for a user of the service including a media queue 224. The user account 222 is associated with a user at the ordering location 234 and the viewing location 228. The database server 220 is configured with an inventory of audiovisual programs that are available for delivery using the media delivery system 210. Application servers 218 and database server 220 is coupled through network 226 to media server 201 and other elements of media delivery system 210 (not shown), to enable the media delivery system 210 to determine which AV files 203 are in media queue 224 for delivery to the viewing location 228. The presentation server 216 is configured with programs for generating a user interface display, receiving user input selecting audiovisual programs for rental or viewing, and other functions.

The media queue 224 may provide a list of AV files 203 that a particular user or user account has rented or requested to download or view. The queue 224 may include a list of both tangible media for rental, such as DVD titles, and AV files 203 for instant watching (i.e., streaming) or for downloading. Media queue 224 also may represent multiple associated queues, so that the service 214 may maintain one queue of tangible media for rental and a separate but associated queue of audiovisual programs for instant watching or downloading. Further, one user account 222 may be associated with multiple user profiles each having a separate queue in any of the foregoing queue arrangements. In one embodiment, the media selection service 214 is the Netflix® service commercially available from Netflix, Inc., Los Gatos, Calif.

Illustratively, viewing location 228 includes the BD-Player 202, an input device 230, and a display 232. For purposes of illustrating a clear example, FIG. 2 shows one viewing location 228, but in a practical embodiment there may be at least many thousands of viewing locations concurrently served by one or more media delivery systems 210.

BD-Player 202 includes any digital media player that complies with one or more of the video based player profiles specified in the Blu-ray® specification. At present the Blu-ray specification includes three video based player profiles known as "Profile 1.0", "Profile 1.1", and "Profile 2.0" ("Profile 2.0" is referred to commercially as "BD-Live"). However, embodiments are not limited to digital media players that implement existing versions of the Blu-ray specification and include digital media players that implement any future version of the Blu-ray specification—or the protocols for streaming media to a networked client device. In addition, BD-Player 202 may implement some or all portions of the Advanced Access Content System (AACS) standard for secure content distribution and digital rights management.

In one embodiment, BD-Player 202 is a computer system configured as a set-top box coupled to data network 226 and configured to receive AV files 203 and generate corresponding video output for a display 232 at viewing location 228. In such a case, the BD-player 202 may include firmware with playback logic configured to multiplex audio and video files streamed by the media delivery system 210. Alternately, the playback logic itself may be streamed to the BD-player 202. For example, the BD-player 202 may be configured to be capable of executing BD-J (Blu-ray Java( ) applications retrieved over the Internet. In such a case, the BD-player 202 first downloads the playback logic as a BD-J application and then executes this application both to configure the BD-player 202 to play a title from media library 212 as well as to retrieve and multiplex audio video streams for the selected title. Non-limiting examples of set-top boxes include Blu-ray Disc player devices, streaming video playback boxes such as the Netflix Player by Roku, digital satellite television set-top boxes, video game consoles, digital video recorder (DVR) devices, cable converter boxes, or a set-top box device configured to support one or more video player profiles of the Blu-ray® specifications. In another embodiment, BD-Player 202 is a desktop or workstation computer system configured coupled to data network 226 and configured with a digital media player application that implements one or more video player profiles of the Blu-ray® specifications (or other streaming media protocols) and that is configured to receive AV files 203 and generate corresponding video output for a display 232 at the viewing location 228.

Input device 230 is any user input device suitable for controlling the operation of BD-Player 202. In an embodiment, input device 230 is a remote control device that uses infrared light-emitting diode emissions, radio-frequency signals, or wired signals to communicate with player 202 and input device 230 comprises one or more control buttons for operating functions of the player 202. For example, input device comprises a play button, a fast forward button, a rewind button, and a selection button. In another embodiment, input device 230 is an alphanumeric keyboard and mouse combination of the kind commonly connected to a personal computer or workstation computer Display 232 is any display device capable of displaying motion picture or video images according NTSC, PAL, ATSC, or other standards for conventional video, HD video, or other format. In an embodiment, display 232 comprises a television monitor or other similar suitable video display.

Ordering location 234 may provide a computer 236 that can connect to presentation server 216 through data network 226. For purposes of illustrating a clear example, FIG. 1 shows one ordering location 234, but in a practical embodiment there may be many thousands of ordering locations concurrently served by one or more media selection services 214. In an embodiment, computer 236 is configured with a browser or other interface program that can connect to a complementary web server or other server program to interact with functions provided by media selection service 214. The ordering location 234 and the viewing location 228 may be the same location or different locations in various embodiments. Further, the functionality of computer 236 may be included in BD-Player 202. For example, BD-Player 202 may be configured with a browser or other user interface program that can connect to a web server or other server program to interact with functions provided by media selection service.

Figure 3:
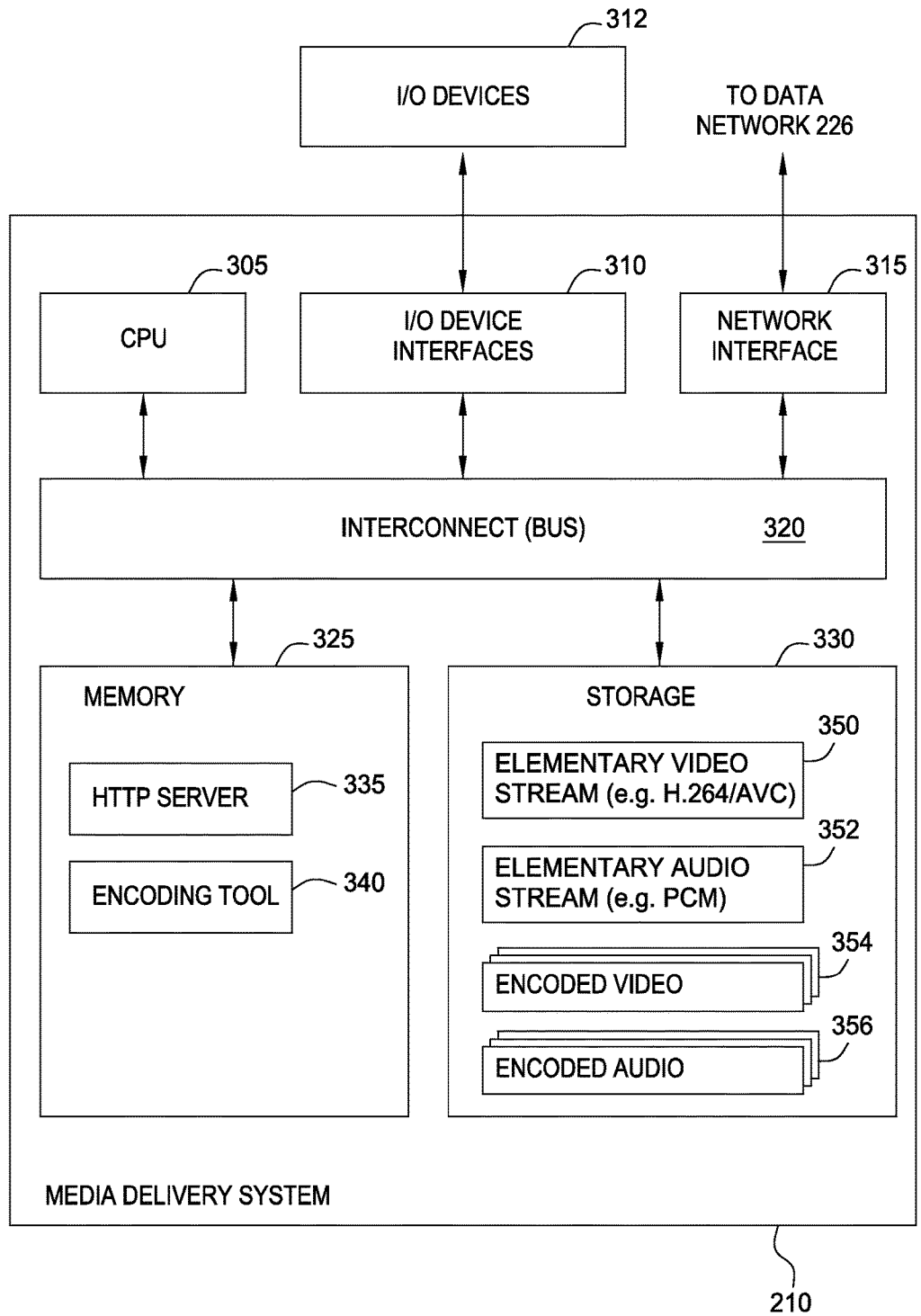
FIG. 3 further illustrates the media delivery system of FIG. 2, according to one embodiment of the invention.

FIG. 3 further illustrates the media server and media delivery system 210 of FIG. 2, according to one embodiment of the invention. As shown, media delivery system 210 comprises a computing system having, without limitation, a central processing unit (CPU) 305, a network interface 315, an interconnect 320, a memory 325, and storage 330. The media delivery system 210 may also include an I/O devices interface 310 connecting I/O devices 212 (e.g., keyboard, display and mouse devices) to the media delivery system 210.

The CPU 305 retrieves and executes programming instructions stored in the memory 325. Similarly, the CPU 305 stores and retrieves application data residing in the memory 325. The interconnect 320 facilitates transmission of programming instructions and application data between the CPU 305, I/O devices interface 310, storage 330, network interface 315, and memory 325. CPU 305 is included to be representative of a single CPU, multiple CPUs, a single CPU having multiple processing cores, and the like. And the memory 325 is generally included to be representative of a random access memory. The storage 330 may be a disk drive storage device. Although shown as a single unit, the storage 330 may be a combination of fixed and/or removable storage devices, such as fixed disc drives, floppy disc drives, tape drives, removable memory cards, optical storage, network attached storage (NAS), or a storage area-network (SAN).

As shown, storage 330 includes elementary video and audio streams 350, 352 and encoded video and audio streams 354, 356. And the memory 325 includes an HTTP server 335 and an encoding tool 340. Each encoded audio and video file 354, 356 is included to represent a copy of the same general media file, encoded at a different bit rate. Of course, in practice, many distinct media titles may be available for streaming. The HTTP server 335 may be configured to stream encoded video files 354 and encoded audio files 356 to a client device (e.g., BD-player 202) using a streaming media protocol. For example, in one embodiment, the encoded video files 354 and encoded audio files 356 are MPEG-2 compliant transport stream files encoding video (or audio) at a specified bit rate. In such a case, the HTTP server 335 may encapsulate MPEG-2 packets in an HTTP stream and transmit them to a client device. More simply, the media server 201 may stream one of the encoded video audio and files 354, 356 selected from the encodings available in storage 330. In turn, the client device may multiplex the files and present them to a playback engine (e.g., a BD-J application executing on a Blu-ray® disc player) for decoding and playback.

In one embodiment, an encoding tool 340 may be configured to generate the encoded video and audio files 354, 356 from an elementary audio/video stream files 350, 352, such as a high-definition H.264/AVC encoded file and a raw audio stream. By sampling the elementary AV stream files 350, 352 the encoding tool 340 may generate multiple video (and audio) encodings of the same media property, each encoded at different bit rates. Further, the encoding tool 340 may generate the encoded video files 354 and/or encoded audio files 356 in a way so as to allow a client device (e.g., a Blu-ray disk player) to receive and multiplex encoded video and audio data in order to generate a multiplexed stream presented to a playback engine on the client device. Further, the encoded video and audio files 354, 356 may be configured to allow the client device to vary the bit rate of the streaming media content, i.e., to dynamically change which of the encoded video files 354 (or audio files 356) is streamed to the client device.

In one embodiment, e.g., the particular encoded video and audio files 354, 356 used to stream data may be determined by the client device as a function of the prevailing bandwidth conditions. For example, the client may be configured to begin streaming playback by initially requesting the lowest bit rate of encoded video files 354 and to increase the bit-rate up to the greatest rate supportable by the prevailing bandwidth between the client device and the media delivery system 210. Further, as the available bandwidth changes, the bit rate at which the encoded video and audio files 354, 356 is streamed may be changed. In such a case, the HTTP server 335 may change from streaming one encoding to the client to another, in response to client requests for video (or audio) data from different encodings. However, rather than reconfiguring the client device each time the streaming bit-rate is changed, the client device may pad portions of the encoded video file 354 such that the size of a given portion matches the configured size of that portion specified to the client device prior to streaming.

For example, each encoded video file 354 may provide a sequence of groups of pictures (GOPs), and a set of sequential GOPs may themselves be grouped, e.g., in groups of video 2 seconds in length. That is, each encoded video file 354 may be subdivided into a number of clip files, and each clip file may include a sequential set of one or more GOPs from a given encoding. The clip files present in a given encoded video file 354 may be specified in the header associated with that file. Further, the header may specify a number of insertion points (by byte or packet offset) in each GOP for multiplexing audio data. In one embodiment, e.g., each GOP may correspond to two seconds of video playback and the header may specify two insertion points for multiplexing audio data with the video data. Corresponding GOPs in different encodings 354 represent the same sequence of pictures (i.e., represent the same two seconds of video) and have the same insertion points. However, as the encoded video files 354 are generated at different bit rates, both the size and the byte/packet offset for each GOP and each insertion point recorded will vary among different encodings. In one embodiment, the encoding tool 340 may be configured to pad an encoded video file 354 with video filler packets such that each GOP begins with an I-frame and that each GOP begins with an MPEG-2 packet having a continuity counter value of 0. Doing so allows a client device to switch from multiplexing one encoded video file 354 with an audio file 356 to a different encoded video file 356, without reconfiguring the playback engine receiving the multiplexed data or otherwise disrupting streaming media playback (save for a change in audio/video quality resulting from the changed bit-rate).

As noted, encoded video file 354 may include a file header indicating the packet (and/or byte) offset of each GOP (and insertion point for multiplexing) in that encoded video file 354. From this information, the size of each GOP may be determined. As the clip files storing the GOPs are downloaded, the client device may compare the size of each GOP to a reference size determined prior to initiating streaming playback. Further, the client device may pad each GOP as necessary so that the size of each GOP in the multiplexed stream presented to the playback engine is the same as specified in the client information file used to configure the playback engine.

Note, while each encoded video and audio files 354, 356 may generally be referred to as having a bit rate using a fixed value (e.g., a bit rate of 1500 k per second) the actual bit rate may vary at different points within a given encoding. As is known, variable bit rate (VBR) encoding techniques adjust the bit rate of an encoding depending on the content being encoded. For example, if there is little change in a visual scene, the bit rate at which content is encoded may be decreased. Conversely, if there is rapid change in the scene, the bit rate may increase, up to the maximum specified for the encoding. Thus, VBR encoding offers a higher audio-visual quality at a smaller file size.

Figure 4:
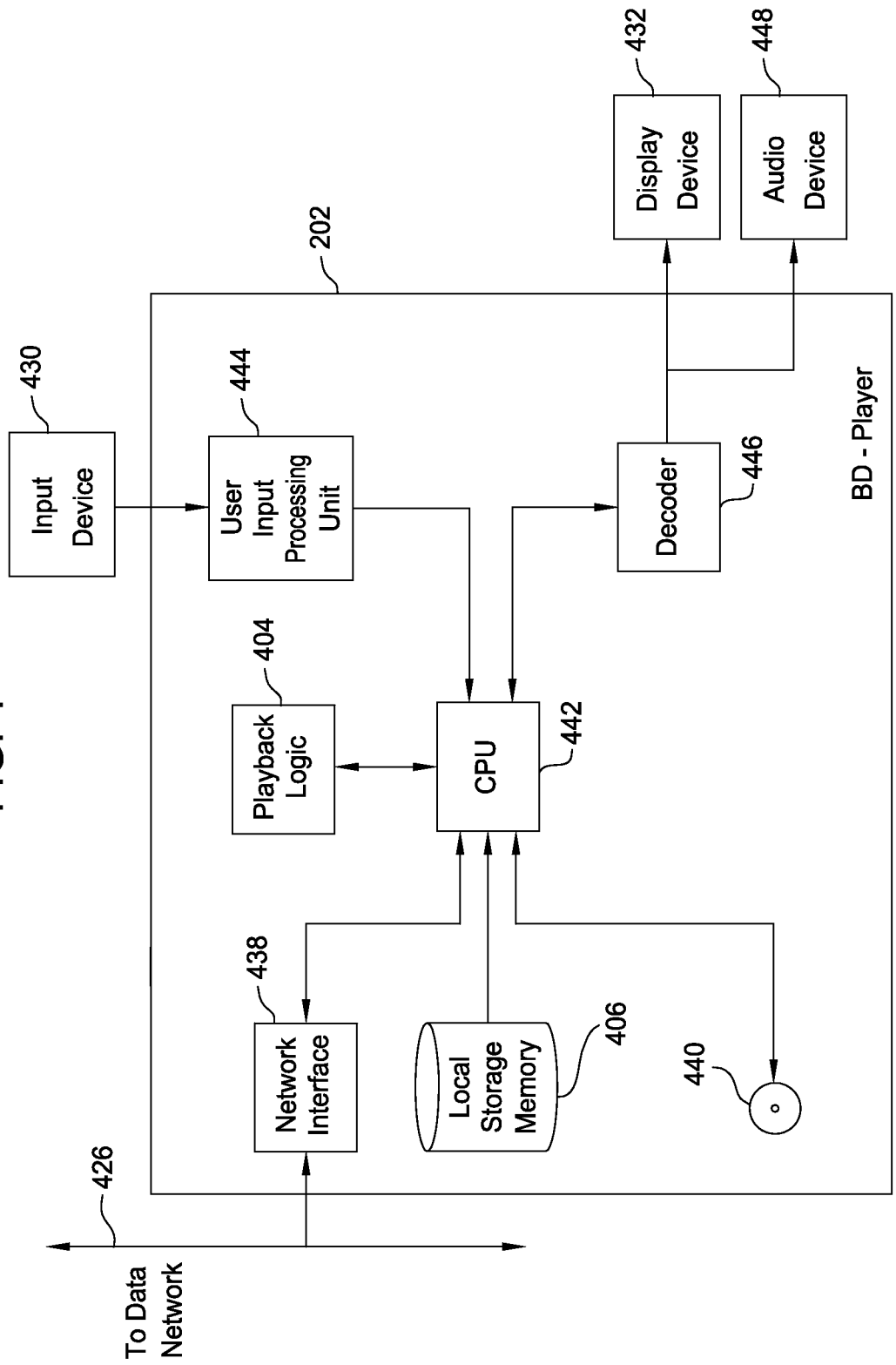
FIG. 4 further illustrates the content player of FIG. 2, according to one embodiment of the invention.

FIG. 4 further illustrates BD-Player 202 of FIG. 2 in greater detail, according to one embodiment of the invention. As shown, BD-Player 202 includes a network interface 438, local storage or memory 406, a removable media device 440, playback logic 404, CPU 442, user input processing unit 444, decoder 446, display device 432, and audio device 348.

Playback logic 404 provides one or more sequences of computer executable instructions for performing various functions that are described further herein. The instructions comprising playback logic 404 may be stored on a non-volatile memory of BD-player 202 such as, for example, a hard disk, flash memory, or firmware of BD player 202. Alternatively, instructions comprising playback logic 404 may be read by player 202 from a removable non-volatile computer-readable storage medium (e.g., a Blu-ray Disc) using removable media device 440. Still further, instructions comprising playback logic 404 may be received over data network 426 via network interface 438 (e.g., as a BD-J application).

The combination of network interface 438 and data network 426 broadly represent any of the following: an Ethernet port configured to couple BD-player 202 to a router, hub, DSL modem or adapter, or cable modem; an integrated DSL modem or adapter, or cable modem; an Ethernet port configured to couple BD-player 202 to a wireless access point; and any other electronic interface to a source of audiovisual program data, and the like.

As noted, in one embodiment, playback logic 404 may comprise an executable Blu-ray® Disc Java (BD-J) application read from a Blu-ray Disc inserted into player 402 and/or downloaded over network 426 from media server 201. In another embodiment, logic 404 is stored in firmware of player 402, for example, in a flash ROM of player 402. In another embodiment, a bootstrap portion of logic 404 is stored in firmware of player 402 and the bootstrap portion, when executed by CPU 342, downloads an application portion of logic 404 (e.g., an BD-J Xlet) from media server 201. The application portion of logic 404, when executed by CPU 442, performs the various functions that are described further herein. CPU 442 may comprise one or more processors and/or one or more processor cores.

Local storage or memory 406 is a hard disk or flash memory for storing files; including playlist information files, clip information files, and AV stream files downloaded from media server 201 by playback logic 404. In one embodiment, playback logic 404 may configure decoder 446 to process a transport stream of a specified size and bit rate by causing player 202 to store a playlist information file and a metadata describing the collection of clip information files associated with a given encoding of a media title. Thereafter, logic 404 may initiate playback of the playlist by invoking a playback function provided by an application programming interface (API) offered by a system layer of player 202. For example, once a user selects a media title for playback, the playback logic 404 may retrieve the headers associated with each bit-rate encoding of that file and generate clip information files describing the size and length of each clip (i.e., the sequence of GOPs) to be streamed as part of playing back the media file. Once this information is received, playback logic 404 may configure the decoder to playback the selected media title and begin downloading the clips of the selected title at a particular bit rate. That is, the playback logic 404 may be begin downloading the sequential audio and video clip files, multiplex them, and once the first clip file is fully downloaded and multiplexed, send it to the decoder 446 for decoding and playback on the display device 432 and audio device 448. If the downloaded clips are smaller than the size specified when configuring the decoder 446, the playback logic may pad each clip as appropriate. This process repeats as subsequent clips are downloaded.

In one embodiment, the playback logic 404 may switch the bit rate of the video (or audio) being downloaded. In such a case, the playback logic may begin requesting clip files from a different encoding of the media title than the one then currently being downloaded. Further, as each encoding was constructed to include the same sequence of GOPs, and such that each GOP begins with an I-frame in an MPEG-2 packet having a continuity counter of 0, the playback engine 404 may seamlessly switch from one bit rate encoding to another at any GOP boundary. That is, to change the bit rate of streaming media playback, the playback engine simply stops multiplexing GOPs from one encoding and begins multiplexing GOPs from another. As noted, to ensure the continuity count remains correct, GOPs may be padded with video filler packets so as to end with a continuity count of 15 (or the largest continuity count value).

Decoder 446 refers broadly to a collection of hardware and/or software components within BD-player 402 that takes as input a transport stream contained in one or more AV stream files stored in local storage 406 and produces as output decompressed video images and audio data for display device 432 and audio device 448. Audio and video streams may be divided into packets (e.g., MPEG-2 packets) and encapsulated in one or more packets of a transport stream. By interleaving/multiplexing transport stream packets containing video data and audio data, audio and video elementary streams encoded at varying bit rates may be synchronized. For example, a transport stream may synchronize video encoded in an elementary stream at 2 Mbps with audio encoded in an elementary stream at 640 kbps. In one embodiment, the transport stream contained in an AV stream file stored in local storage 406 is a Moving Picture Experts Group-2 (MPEG-2) Transport Stream (ISO/IEe 13818-1) contained in a structure compliant with the Blu-ray specification referred to in the Blu-ray specification as a "BDAV MPEG-2 Transport Stream".

Decoder 446 may include any combination of sub-components such as a buffer for queuing transport stream packets read from an AV stream file, a de-multiplexer for de-multiplexing the stream of transport stream packets into separate elementary audio and video streams, and an audio decoder and a video decoder for decompressing elementary audio and video streams respectively.

User input processing unit 444 processes input signals received from input device 430. An input signal processed by user input processing unit 444 may result in an event notification to a program or process executing instructions included in playback logic 404. Logic 404 may be configured to handle various types of event notifications from user input processing unit 444. For example, playback logic 404 may receive an event notification when a user uses input device 430 to initiate playback of an AV program or perform a seek function within an AV program. In response to receiving such an event notification, playback logic 404 may configure decoder 446 of player 202 to process the AV program at a particular bit rate by downloading and storing in local storage 406 the playlist information file and clip information files of the AV program.

Figure 5:
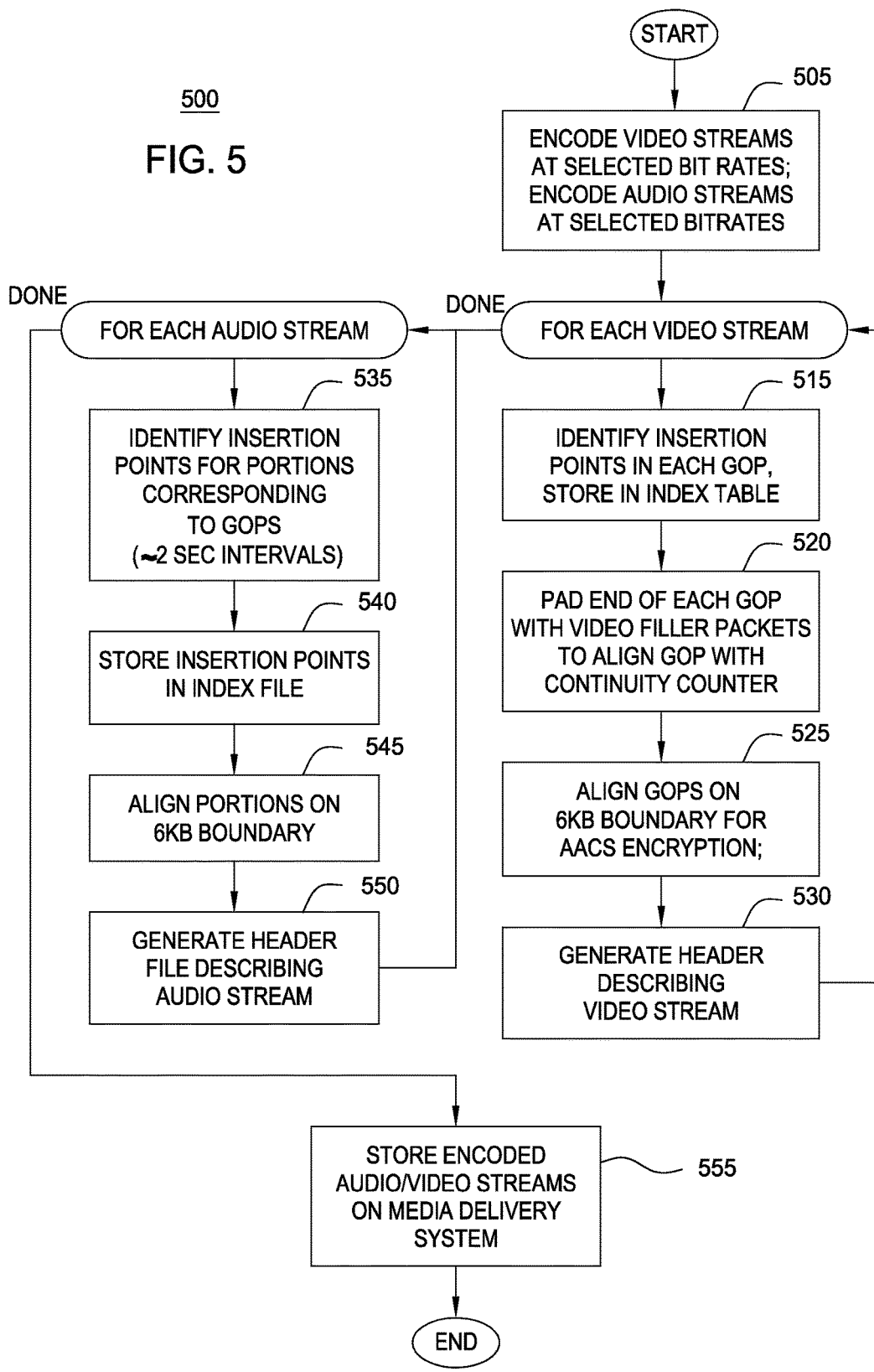
FIG. 5 illustrates a method for encoding a media file to allow for on-device multiplexing on a networked client device, according to one embodiment of the invention.

FIG. 5 illustrates a method 500 for encoding a media file to allow for on-device multiplexing on a networked client device, according to one embodiment of the invention. As shown, the method 500 begins at step 505 where an encoding tool generates multiple encoded video files for a given media title (e.g., for a particular movie). For example, an encoding tool may sample a high-quality encoding (e.g., an H.264/AVC file) or sample raw audio/video data to create multiple encoded files, each with a specified bit rate.

As part of the encoding process, each video stream may be constructed to allow a client device to dynamically switch between different bit rates during streaming media playback. At step 515, the encoding tool identifies the position (by byte or packet offset) of insertion points in each GOP for audio multiplexing. For example, each GOP may represent two seconds of video playback and insertion points may be selected to subdivide each GOP into three relatively equal size chunks. Doing so subsequently results in a multiplexed stream alternating between two-thirds of second of video and audio data when the encoded audio and video files are streamed and multiplexed by the client device. At step 520, the encoding tool may pad the end of each GOP with video filler packets as appropriate such that each GOP ends with a packet having a continuity counter value of 15 (in the case of an MPEG-2 transport stream encoding). Doing so results in each GOP beginning with continuity counter value of 0. Thus, as the client device only switches video bit rates on a GOP boundary, the continuity counter remains correct when dynamically switching bit rates during streaming media playback.

In one embodiment, at step 525, the packets in an encoded video file may be aligned along a 6 Kb boundary (6128 bytes). Doing so allows for the video content to be encrypted using the AACS standard. As is known, with AACS, each aligned unit is independently encrypted using a CPS Unit Key. Note, rather than simply pad a portion of each GOP, one portion of a GOP may "borrow" data from a subsequent portion. to minimize the amount of padding that is needed to create a 6128 byte AACS block. Additionally, the end of each GOP may be padded include video filler packets to allow the last packet of the GOP to have a particular continuity counter value (e.g., 15). The resulting structure of each GOP and corresponding audio data is further illustrated in FIG. 8, discussed below. At step 530, the encoding tool may generate a file header describing the content of an encoded stream. The file header may include, among other things, a field indicating the size of the header itself and a byte offset where video data begins in the file. Further, the header may also include an index indicating a position (by byte or packet) for the beginning of each GOP and the position of each audio insertion point (to allow for on-device multiplexing). The index may also specify the size of each GOP (to allow for on-device padding). Steps 515-530 are performed to prepare each encoded video file for streaming. Once completed, the resulting video encodings may be stored on a media delivery system to be streamed to clients upon request.

At step 535, the encoding tool identifies the position (by byte or packet offset) for splitting each audio segment into chunks for multiplexing. As described above, each audio chunk may correspond to approximately two seconds of audio in the media file, and the insertion points may subdivide each chunk into approximately two-thirds of a second of audio. Again, this results in a multiplexed stream alternating between two-thirds of second of video and audio data when the encoded audio and video files are streamed and multiplexed by the client device. At step 540, an index is generated for the audio file being processed. The index may indicate, among other things, a byte or packet offset for each chunk of audio and each insertion point for multiplexing audio data with video data. At step 545, like the encoded video files, each portion of an audio file resulting from the identified insertion points may be may be padded so as to align along an encryption block boundary (e.g., 6128 bytes, allowing the audio content to be encrypted using the AACS standard). Note, rather than simply pad each portion of audio data with null packets, one portion of audio data may "borrow" packets from the subsequent portion to minimize the amount of padding included in a 6128 byte AACS block.

At step 550, the encoding tool may generate a file header describing the contents of the audio file. The header may include, among others, a field indicating the size of the header itself and a byte (or packet) offset where the audio data begins, and also include the index indicting the positions of the audio chunks and insertion points for multiplexing the audio encoding with the video encodings. At step 555, the encoded audio and video stream files may be stored on a media delivery system to be streamed to clients upon request.

Figure 6:
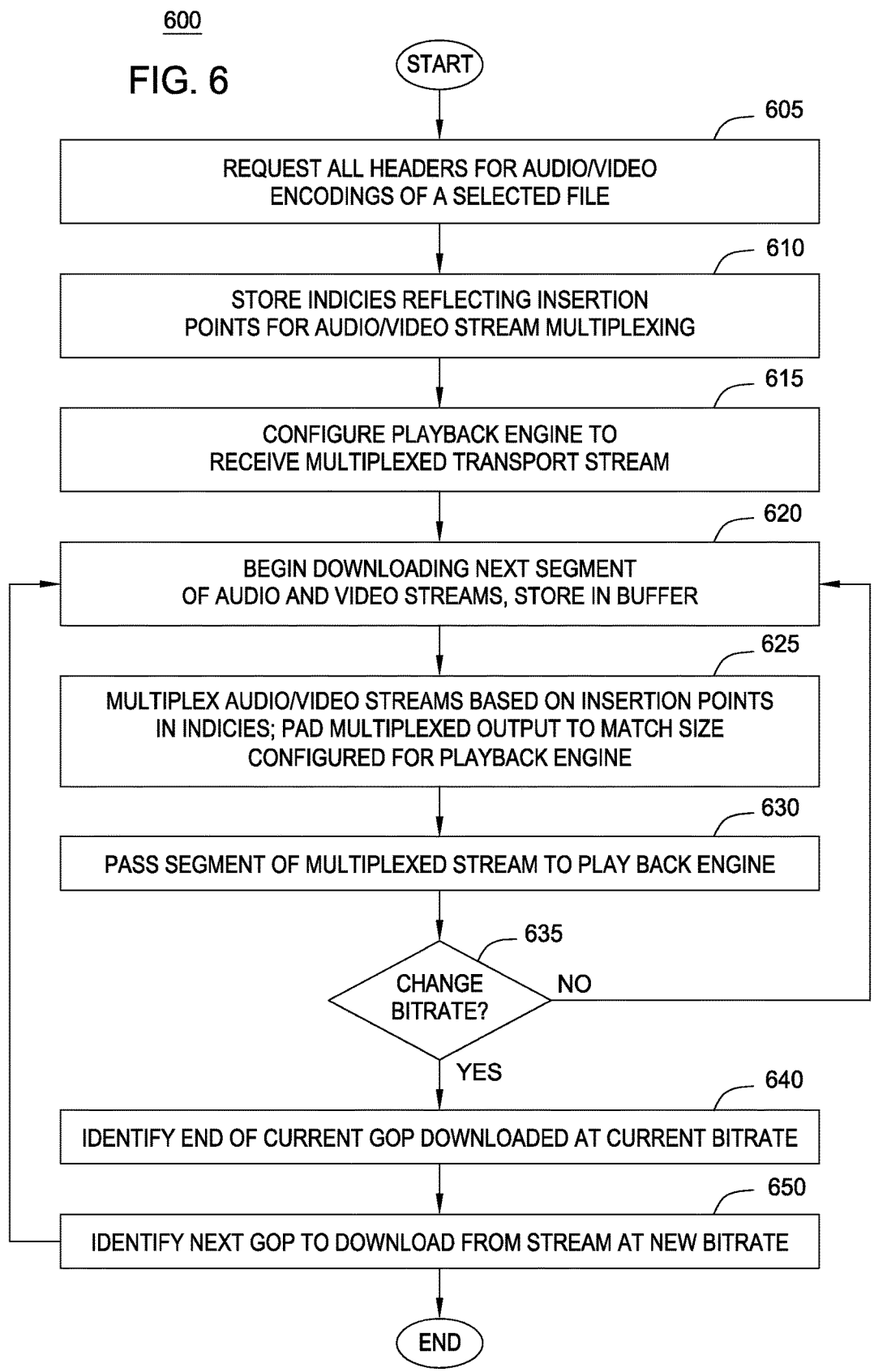
FIG. 6 illustrates a method for on-device multiplexing of streaming media content delivered to a networked client device, according to one embodiment of the invention.

FIG. 6 illustrates a method 600 for on-device multiplexing of streaming media content delivered to a networked client device, according to one embodiment of the invention. As shown, the method 600 begins at step 605 where a client device requests the file header for each available video and audio encoding of a selected media title (e.g., a particular movie). In one embodiment, the request may be two-fold, with a first request to identify the size of a given header and a second request to retrieve the complete header based on the identified size. Once retrieved, at step 610, the client device may store indices stored in the file headers. As noted above, the file header for each video may include an indication of the byte or packet offset of each video segment (i.e., each GOP) and the insertion points for multiplexing the audio corresponding to each video segment. Additionally, the index may indicate (or the client device may derive) a size for each chunk of video (or each GOP) in a given encoded video file. Similarly, the header of an encoded audio file may include an indication of the positions of points at which to multiplex the audio chunks with the video.

At step 615, the client device may configure a playback engine to receive a multiplexed transport stream. For example, in the case of a Blu-ray® disc player, playback logic may configure a playback engine to receive a BDAV MPEG-2 Transport Stream—which the client device will subsequently generate by multiplexing video and audio stream data received from the streaming media server. The profile for such a BDAV MPEG-2 Transport stream may have a profile derived from the information stored in the file headers requested at step 605 and indices stored at step 610. Specifically, the size of each clip file to download from the server may be derived from the collection of encoded video files. As each encoded video file stores the same sequence of GOPs (which may differ by packet number and byte size) the client device may configure the playback engine to receive the largest clip file stored in any of the encoded video files. The largest clip file is selected so that any clip file actually used may be padded if needed to match the size of the largest clip file. That is, as noted above, in the event that a clip file is streamed from one of the video encodings with a size less then the largest one, such a file may be padded so as to match the size used to configure the playback engine on the client device.

In the event that multiple audio files are available, then the sizes of the audio segments in the available audio encodings may be used to configure the playback engine in a similar manner. Otherwise, if the file is to be streamed and multiplexed by the client device using a single audio encoding and possibly multiple video bit-rate encodings, then the size of the audio segments indicated in the header of the selected audio encoding is used to configure the playback engine.

Once configured, at step 620, the client device may begin downloading the next (or initial) segments of audio and video streams and store the streamed data in a buffer as it is received from the streaming media server. At step 625, once a segment of video data is available (e.g., a complete GOP) and a corresponding segment of audio data is available, the client device may multiplex the audio and video streams received from the server based on the insertion points indicated in the indices stored at step 610. Additionally, if any GOP in the video stream is less than the configured size, such a GOP may be padded to match the size used to configure the playback engine on the client device. At step 630, the multiplexed segments of audio and video may be passed to the playback engine on the client device for decoding and playback to a user.

At step 635, unless the bit rate for streaming video (or optionally audio) data has changed, then the method 600 returns to step 620 and where the client device begins downloading the next segments of audio and video data for multiplexing. Otherwise, if the bit rate has changed, the client device may identify the end of a current GOP downloaded from the server at a current bit rate (step 640). At step 650, the client device identifies the video file which stores the next GOP encoded at the new bit rate. Thereafter, the method 600 returns to step 620 where the client device begins downloading audio data and downloading video data at the new bit rate. Data from the encoded video file having the new bit rate may then be multiplexed with the audio data along a GOP boundary and supplied to the playback engine for decoding and playback to the user.

While the client device (or the streaming media server) may elect to change the bit rate of video data streamed to the client for a variety of reasons, in one embodiment, the bit rate may be changed in response to changes in prevailing bandwidth conditions and the amount of streaming media then buffered on the client device. As another example, bit rates may be changed shortly after initiating playback, e.g., the client may first request video data at the lowest available encoded bit rate, allowing for a rapid start up of video playback. Subsequently, the client may then increase the bit rate as the prevailing bandwidth conditions allow to improve the video quality of video decoded and presented to a user.

Figure 7:
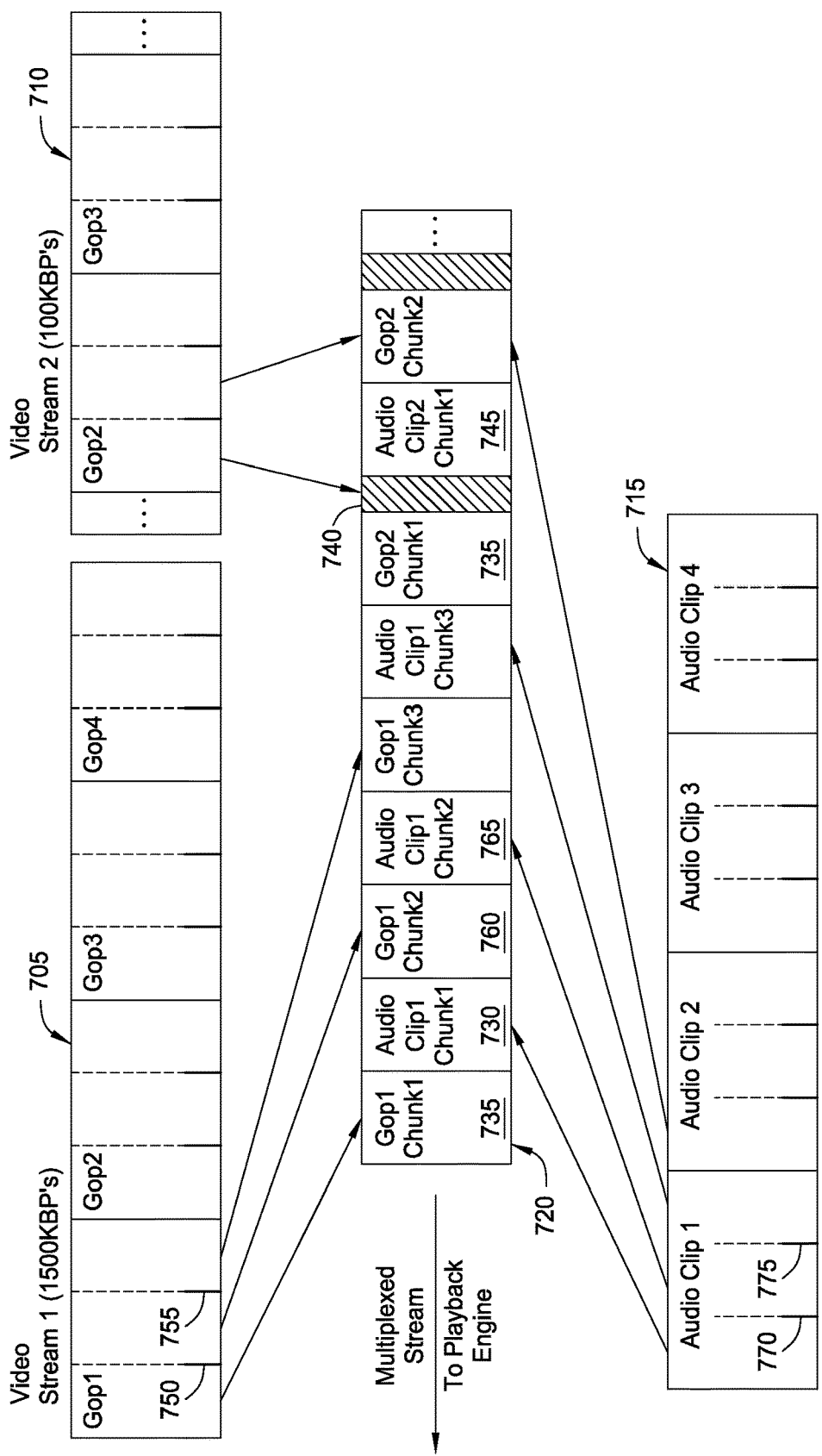
FIG. 7 illustrates an example of multiplexing a video and audio stream supplied to a playback engine, according to one embodiment of the invention.

FIG. 7 illustrates an example of multiplexing a video stream with an audio stream supplied to a playback engine, according to one embodiment of the invention. As shown, a first video stream 705 and a second video stream 710 each include sequential GOPs encoding a portion of a media title (labeled GOP1 through GOP4). And an audio stream 715 includes a sequence of audio clips corresponding to the GOPs in video streams 705 and 710 (labeled Audio Clip 1-Audio Clip 4). Illustratively, each GOP in video stream 705 and 710 and audio stream 715 includes hash marks (e.g., marks 750 and 755 in GOP1 and marks 770 and 775 in audio stream 715) indicating the positions stored in the file header associated with a respective video stream 705, 710 and audio stream 715 for multiplexing the audio and video data in these streams.

Additionally, FIG. 7 illustrates an example multiplexed stream 720 being constructed from the video streams 705, 710 and audio stream 715. As shown, the multiplexed stream 720 alternates between portions of video and audio data. For example, multiplexed stream 720 includes a first chunk 725 of video data taken from GOP1 followed by a first chunk 730 of audio data taken from Audio Clip 1. This pattern then repeats as the multiplexed stream 720 then includes a second chunk 760 of video data from GOP1 followed by a second chunk 765 of audio data from Audio Clip 1. Assume for this example, that the client device multiplexing video data from video stream 705 and audio data from audio stream 715 elects to change the bit rate of the video data being streamed from 1500 kbps (stream 705) to 1000 kbps (stream 710). As described above, the encoded video streams available from a server may be encoded to allow for a switch in bit rates along a GOP boundary.

Accordingly, following the second audio clip 765, the client device multiplexes the remaining portions of GOP1 and Audio Clip 1 into multiplexed stream 720. The client device then downloads GOP2 from video stream 710 and multiplexes a first chunk 735 of GOP2 into the multiplexed stream 720 followed by a first chunk 745 of audio data taken from Audio Clip 2. Note, in this example, as the first chunk 735 of GOP2 was retrieved from a lower-bit rate stream, it is smaller then the size of this portion of the video data specified to the playback engine during the configuration process. Accordingly, prior to multiplexing the first chunk 745 of audio data from Audio Clip 2 into multiplexed stream 720, the client device may add padding 740 as appropriate such that the size of the first chunk 735 of video data from GOP2 matches the configured size of this portion of video data. The client device continues multiplexing the streamed portions of audio and video data and supplying the resulting multiplexed stream 720 to the playback engine for decoding and playback to a user.

Figure 8:
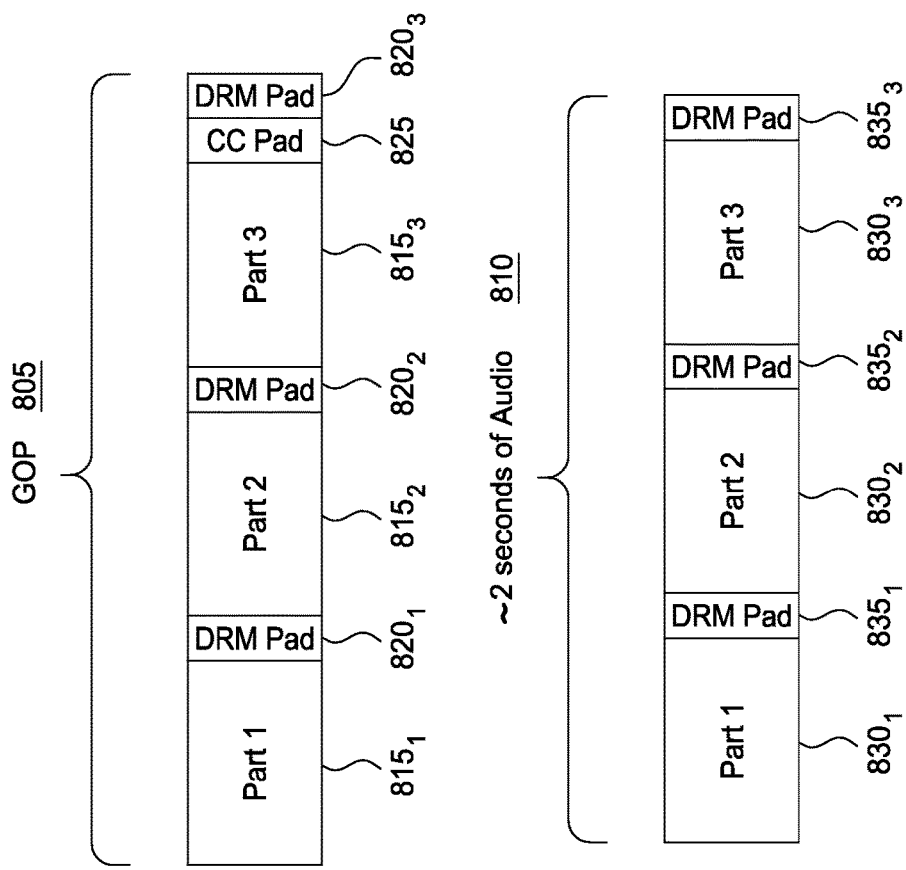
FIG. 8 further illustrates portions of audio and video encoded in audio and video streams prior to being multiplexed on a client device, according to one embodiment of the invention.

FIG. 8 further illustrates portions of audio and video data encoded in audio and video streams prior to being multiplexed on a client device, according to one embodiment of the invention. As shown, FIG. 8 includes a GOP 805 and a portion 810 of an audio file storing approximately 2 seconds of encoded audio. The GOP 805 generally corresponds to any of the GOPs in the video streams 705, 710 shown in FIG. 7. Similarly, audio portion 810 generally corresponds to any of the audio clips in audio stream 715 shown in FIG. 7.

In this example, GOP 805 includes three portions of video data. Each video part $815_{1-3}$ corresponds to one third of the GOP 805. Each video part $815_{1-3}$ may include a number of packets of video data (e.g., MPEG-2 transport stream packets) and end at an insertion point for multiplexing with audio portion 810, as identified during the encoding process. For example, video part $815_1$ of GOP 805 may correspond to the first chunk of GOP 1 shown in FIG. 7. And video parts $815_2$ and $815_3$ of GOP 805 may correspond to the second and third chunks of GOP 1 shown in FIG. 7. Similarly, audio part $830_1$ may generally correspond to the first chunk of audio stream 710 shown in FIG. 7.

Following each of the video parts $815_{1-3}$ is DRM (digital rights management) padding $820_{1-3}$. In one embodiment, DRM padding 820 is added to each of the video parts $815_{1-3}$ as needed in order to align a given part 805 along an encryption block boundary (e.g., a 6128 byte AACS block boundary). For example, the DRM padding 820 may simply be null packets added as needed. Alternatively, however, the DRM padding 820 may "borrow" data packets from the next portion of video data. Thus, the DRM padding $820_1$ following video part $815_1$ may include null packets, data packets borrowed from video part $815_2$, or both. Similarly, the DRM padding $820_2$ following video part $815_2$ may include null packets, data packets borrowed from part $815_3$, or both. However, part $815_3$ includes continuity counter (CC) padding 825 prior to DRM padding $820_3$. In this example, GOP 805 is padded with video filler packets as appropriate such that GOP 805 ends with a packet having a particular continuity counter such that the first video data packet in the next GOP will have a continuity counter value of 0. Following the CC padding 825 (if any) is DRM padding $820_3$, which consists of null padding packets used to align video part $815_3$ along an encryption block boundary.

Audio portion 810 includes DRM padding similar to that of GOP 805. That is, following each audio part $830_{1-3}$ is DRM padding $835_{1-3}$. Specifically, DRM padding $835_1$ following audio part $830_1$ includes null packets, data packets borrowed from audio part $830_2$, or both. And DRM padding $835_2$ following audio part $830_2$ includes null packets, packets borrowed from audio part $830_3$, or both. Lastly, DRM padding $835_3$ following audio part $830_3$ includes null padding packets. By padding each video part $815_{1-3}$ of GOP 805 and each part $830_{1-3}$ of audio portion 810, each of these segments of audio and video data fall along an encryption block boundary. Further, by padding the end of each GOP with CC padding 825, GOPs from different available video encoding may follow one another.

In sum, techniques are disclosed for multiplexing a dynamic bit-rate video stream with an audio stream received by a client device in a manner that allows the resulting multiplexed stream to be played back without disruption, despite dynamic changes in the bit rate of the video stream that may occur. Doing so allows, e.g., a BD-player to seamlessly change bit rates during playback, i.e., to change bit rates without requiring the BD-player to be reconfigured with changed size data or causing a noticeable interruption of smooth audio and video playback each time the streaming bit rates are changed. As video data is downloaded for playback, the size of the clip file (or the size of GOPs in the clip file) is compared with a corresponding clip information file. The clip information file may be used to configure the BD-Player prior to initiating playback of streaming AV data. Playback logic executing on the BD-Player may pad the clip file (or one or more GOPs in the clip file) such that the size of the clip file matches the configured size specified in the clip information file. Once padded as appropriate, the video data may be multiplexed with audio data and supplied to a playback engine for decoding and presentation to a viewer.

One embodiment of the invention may be implemented as a program product stored on computer-readable storage media within the client device. In this embodiment, the content client device may be embedded within a computing device such as a set top box or BD-player. An alternative embodiment may be implemented as a program product that is downloaded to a memory within a computer system, for example as executable instructions embedded within an Internet web site. In this embodiment, the client device comprises the computer system.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method, comprising:
   identifying within each portion of video data included in a first video encoding of a media file one or more insertion points where a sub-portion of video data is multiplexed with a sub-portion of audio data, wherein the first video encoding comprises the media file encoded at a first bit rate;
   generating a first file header for the first video encoding that includes an indication of a position of each insertion point within the first video encoding;
   generating a second file header for an audio encoding of the media file that includes an indication of a position of each point within the audio encoding where a sub-portion of audio data is multiplexed with a sub-portion of video data; and
   storing the first video encoding and the audio encoding file for transmission to the client device, wherein the client device is configured to multiplex transmitted sub-portions of video data with transmitted sub-portions of audio data based on the indications of the positions of the insertions points included in the first file header and the indications of the positions of the points included in the second file header.

2. The computer-implemented method of claim 1, further comprising padding at least one portion of video data included in the first video encoding to align the at least one portion with a continuity count boundary.

3. The computer-implemented method of claim 2, wherein the first video encoding comprises a sequence of one or more groups of pictures (GOPs).

4. The computer-implemented method of claim 3, wherein each GOP is encapsulated in a sequence of MPEG-2 transport stream packets, and wherein padding the at least one portion of video data to the at least one portion with a continuity count boundary comprises padding the at least one portion of video data with video filler packets such that each GOP begins with an MPEG-packet having a continuity count of 0 and ends with a packet having a continuity count of 15.

5. The computer-implemented method of claim 1, further comprising:
 aligning at least one portion of video data included in the first video encoding to an encryption block boundary; and
 aligning at least one portion of audio data included in the audio encoding to an encryption block boundary.

6. The computer-implemented method of claim 5, wherein aligning the at least one portion of video data comprises at least one of adding null padding packets to the at least one portion of video data and borrowing packets from a subsequent portion of video data, and wherein aligning the at least one portion of audio data comprises at least one of adding null padding packets to the at least one portion of audio data and borrowing packets from a subsequent portion of audio data.

7. The computer-implemented method of claim 5, wherein the encryption block boundary comprises an AACS encryption block boundary.

8. The computer-implemented method of claim 1, further comprising:
 receiving a request to stream the media file from the client device;
 transmitting the first file header for the first video encoding to the client device;
 transmitting the second file header for the audio encoding to the client device; and
 in response to one or more subsequent requests from the client device, transmitting one or more sub-portions of video data from the first video encoding to the client device, and transmitting one or more sub-portions of audio data from the audio encoding to the client device.

9. The computer-implemented method of claim 1, wherein the first file header further includes a field indicating the size of the file header, a byte offset indicating where the video data included in the first video encoding begins, and an index indicating a position of each portion of video data included in the first video encoding as well as the indications of the positions of the insertion point within the first video encoding.

10. The computer-implemented method of claim 1, wherein the second file header further includes a byte or packet offset for each portion of audio data included in the audio encoding.

11. A non-transitory computer-readable storage medium including instructions that, when executed by a processor, cause the processor to encode a media file by performing the steps of:
 generating a first file header for a first video encoding of a media file that includes an indication of a position of each insertion point within the first video encoding where a sub-portion of video data is multiplexed with a sub-portion of audio data;
 generating a second file header for an audio encoding of the media file that includes an indication of a position of each point within the audio encoding where a sub-portion of audio data is multiplexed with a sub-portion of video data; and
 storing the first video encoding and the audio encoding file for transmission to the client device, wherein the client device is configured to multiplex transmitted sub-portions of video data with transmitted sub-portions of audio data based on the indications of the positions of the insertions points included in the first file header.

12. The non-transitory computer-readable storage medium of claim 11, wherein the first video encoding includes a plurality of portions of video data, and further comprising padding at least one portion of video data to align the at least one portion with a continuity count boundary.

13. The non-transitory computer-readable storage medium of claim 12, wherein the first video encoding comprises a sequence of one or more groups of pictures (GOPs).

14. The non-transitory computer-readable storage medium of claim 13, wherein each GOP is encapsulated in a sequence of MPEG-2 transport stream packets, and wherein padding the at least one portion of video data to the at least one portion with a continuity count boundary comprises padding the at least one portion of video data with video filler packets such that each GOP begins with an MPEG-packet having a continuity count of 0 and ends with a packet having a continuity count of 15.

15. The non-transitory computer-readable storage medium of claim 11, wherein the first video encoding includes a plurality of portions of video data, and further comprising:
 aligning at least one portion of video data included in the first video encoding to an encryption block boundary; and
 aligning at least one portion of audio data included in the audio encoding to an encryption block boundary.

16. The non-transitory computer-readable storage medium of claim 15, wherein aligning the at least one portion of video data comprises at least one of adding null padding packets to the at least one portion of video data and borrowing packets from a subsequent portion of video data, and wherein aligning the at least one portion of audio data comprises at least one of adding null padding packets to the at least one portion of audio data and borrowing packets from a subsequent portion of audio data.

17. The non-transitory computer-readable storage medium of claim 15, wherein the encryption block boundary comprises an AACS encryption block boundary.

18. The non-transitory computer-readable storage medium of claim 11, further comprising:
 receiving a request to stream the media file from the client device;
 transmitting the first file header for the first video encoding to the client device;
 transmitting the second file header for the audio encoding to the client device; and
 in response to one or more subsequent requests from the client device, transmitting one or more sub-portions of video data from the first video encoding to the client device, and transmitting one or more sub-portions of audio data from the audio encoding to the client device.

19. The non-transitory computer-readable storage medium of claim 11, wherein the first file header further includes a field indicating the size of the file header, a byte offset indicating where the video data included in the first video encoding begins, and an index indicating a position of each portion of video data included in the first video encoding as well as the indications of the positions of the insertion point within the first video encoding.

20. A server machine, comprising:
- a memory that includes an encoding tool;
- a storage element that includes a first video encoding of a media file and an audio encoding of the media file for transmission to a client device, wherein the first video encoding includes a plurality of portions of video data, and the audio encoding includes a plurality of portions of audio data; and
- a processor coupled to the memory and the storage element, wherein, when executed by the processor, the encoding tool configures the processor to:
  - generate a first file header for a first video encoding of a media file that includes an indication of a position of each insertion point within the first video encoding where a sub-portion of video data is multiplexed with a sub-portion of audio data, and
  - generate a second file header for an audio encoding of the media file that includes an indication of a position of each point within the audio encoding where a sub-portion of audio data is multiplexed with a sub-portion of video data,
  - wherein the client device is configured to multiplex transmitted sub-portions of video data with transmitted sub-portions of audio data based on the indications of the positions of the insertions points included in the first file header.

* * * * *